United States Patent [19]

Fiala et al.

[11] 3,807,523
[45] Apr. 30, 1974

[54] SAFETY BELT ARRANGEMENT FOR VEHICLES

[75] Inventors: Ernst Fiala, Margaretenhohe; Hans-Peter Willumeit, Brockenblick, both of Germany

[73] Assignee: Volkswagenwerk Aktiengesellschaft, Wolfsburg, Germany

[22] Filed: May 30, 1972

[21] Appl. No.: 257,632

[30] Foreign Application Priority Data
Feb. 26, 1972  Germany............................ 2209271

[52] U.S. Cl............................ 180/82 C, 280/150 SB
[51] Int. Cl. ................................................ B60r 21/10
[58] Field of Search ............. 280/150 SB; 180/82 C; 297/385, 386, 387

[56] References Cited
UNITED STATES PATENTS
| | | | |
|---|---|---|---|
| 3,680,883 | 8/1972 | Keppel | 280/150 SB |
| 3,684,310 | 8/1972 | Westrate | 280/150 SB |
| 2,858,144 | 10/1958 | Oppenheim | 280/150 SB |

*Primary Examiner*—David Schonberg
*Assistant Examiner*—Terrance L. Siemens
*Attorney, Agent, or Firm*—Ernest F. Marmorek

[57] ABSTRACT

A safety belt arrangement for motor vehicles including a safety belt having one end secured to a point on the vehicle frame, another end being adapted to releasable securing at another point of the frame, an operating means being coupled to the belt for operating the belt between an initial or open position and buckled position in which a person seated in the vehicle is safely buckled up by the belt, a cable-type belt, a cable-type belt guide mounted on a side frame or on the roof inside of the vehicle and having one end secured to a return spring or to the front seat of the vehicle and the other end of the belt guide being operably coupled with the operating means, a belt hook, belt guide to the safety belt and adapted to be inserted and fixedly but releasably secured into a hook latch fixed to a portion of the vehicle frame and thereby buckling in the seated person when the door is closed or when the front seat is moved upright and releasing the seated person from the "buckled up" position when the door is opened, or when the front seat is tilted forward. Actuation of the operating means is also provided by the ignition key or other contacts actuated before the vehicle is operational.

6 Claims, 5 Drawing Figures

SAFETY BELT ARRANGEMENT FOR VEHICLES

CROSS REFERENCE TO OTHER APPLICATIONS

Reference should be had to the full contents of the concurrently filed application of Ernst Fiala, Hans-Peter Willumeit, Andreas Bauer and Dieter Protze entitled "Safety Belt Arrangement For Vehicles" and assigned to the assignee of the present application and having the U.S. Pat. Ser. No. 257,805 and filing date of May 30, 1972, now abandoned.

FIELD OF THE INVENTION

The present invention relates to safety belt arrangements especially for motor vehicles, in which the safety belt at one end portion thereof is fixedly secured to a seat or a frame portion near the floor of the vehicle and at the other end thereof which end is formed, for example, by being looped around, is movably secured at another frame portion, wherein the operation of a part inside the vehicle controls the safety belt system and which is operated by a drive means so that when the aforementioned vehicle part is operated, a forced buckling up of the safety belt system results and, wherein in the region of a side frame and/or of the roof portion of the vehicle a belt guide means is provided in a manner not preventing operation of the aforementioned vehicle portion and wherein on such aforementioned belt guide means a lock hook means is provided which couples the belt guide means to the safety belt and which is in the buckled up position is latched in a latching means.

SUMMARY OF THE INVENTION

It is an object of the present invention to provide a safety belt system for vehicles which provides for a forced buckling up of the safety belt system when the vehicle door is closed and at the same time provides for a free access to the seat when the door is open.

It is another object of the present invention to provide an automatic safety belt system for a vehicle, especially for a motor vehicle, to extend the applicability of the safety belt system of the aforementioned co-pending patent application to other seats of the vehicle and add further novel and improved features to it.

The present invention provides that the belt guide means is controlled by the positioning of the back rest of a front seat or by the entire front seat. The present invention provides that the belt guide means in one embodiment at one end thereof is coupled directly with the back rest of the front seat while in the other embodiments it is coupled with a returning spring means and at the other end portion thereof is coupled in all embodiments with the drive means for the belt guide. The guide means is preferably commenced in its operation with the backrest of the seat.

According to a further aspect of the present invention the backrest of the seat serves as the drive itself. For this purpose the backrest is provided with a lever or with a cable system which then is coupled to the belt guide.

The belt guide means in one embodiment is looped from a point in a side frame of the vehicle placed at a height which is conventional as the coupling point for shoulder straps, to a second point lying at a height of the roof in a region of an end portion of the forwardly tilted backrest of the front seat. In order to enable an easier access into the vehicle when the door is opened the second point is provided in the neighborhood of the center plane of the vehicle. A similar construction of the belt guide means is possible also for the safety belt system for the front seats, such as, described in the aforementioned co-pending application.

In all embodiments the safety belt is coupled to the operating belt guide by a hook which when the belt guide is run into a latching means providing the buckled up position for the seated person. The safety belt is secured at one point to the frame while at one end is secured by the hook to the latching means.

BRIEF DESCRIPTION OF THE DRAWINGS

The invention will become more readily apparent from the following description of preferred embodiments thereof shown, by way of example, in the accompanying drawing in which.

DESCRIPTION OF THE PREFERRED EMBODIMENTS

Figure 1:
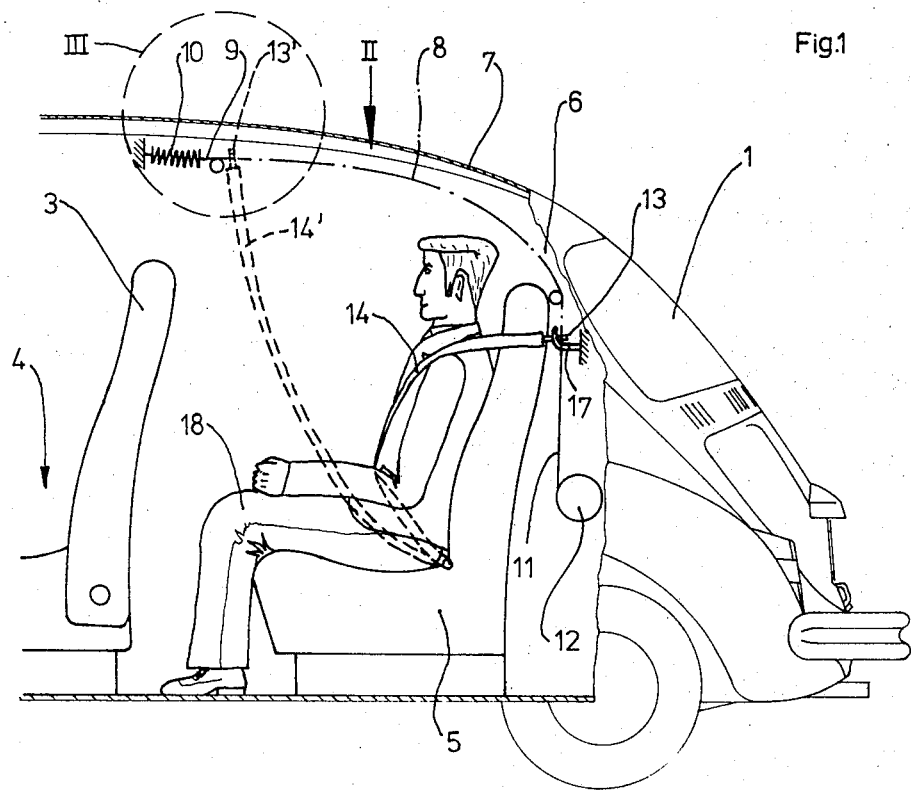
FIG. 1 is a side view of the arrangement of the safety belt system in a vehicle according to the present invention.
Figure 2:
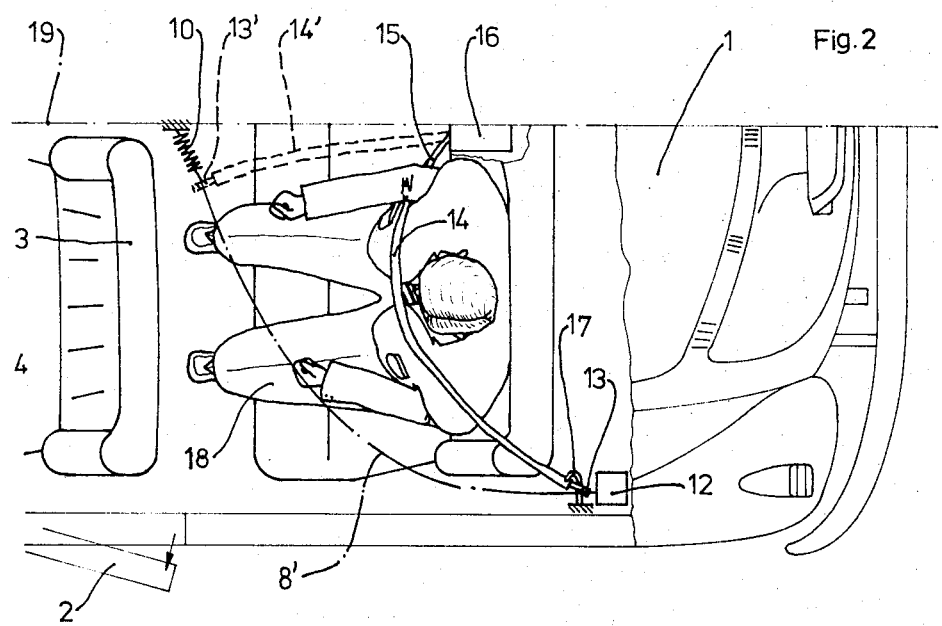
FIG. 2 is a plan view in the direction of the arrow II in FIG. 1 illustrating the fixing of the belt guide means at the second point in the region of the center plane of the vehicle.
Figure 4:
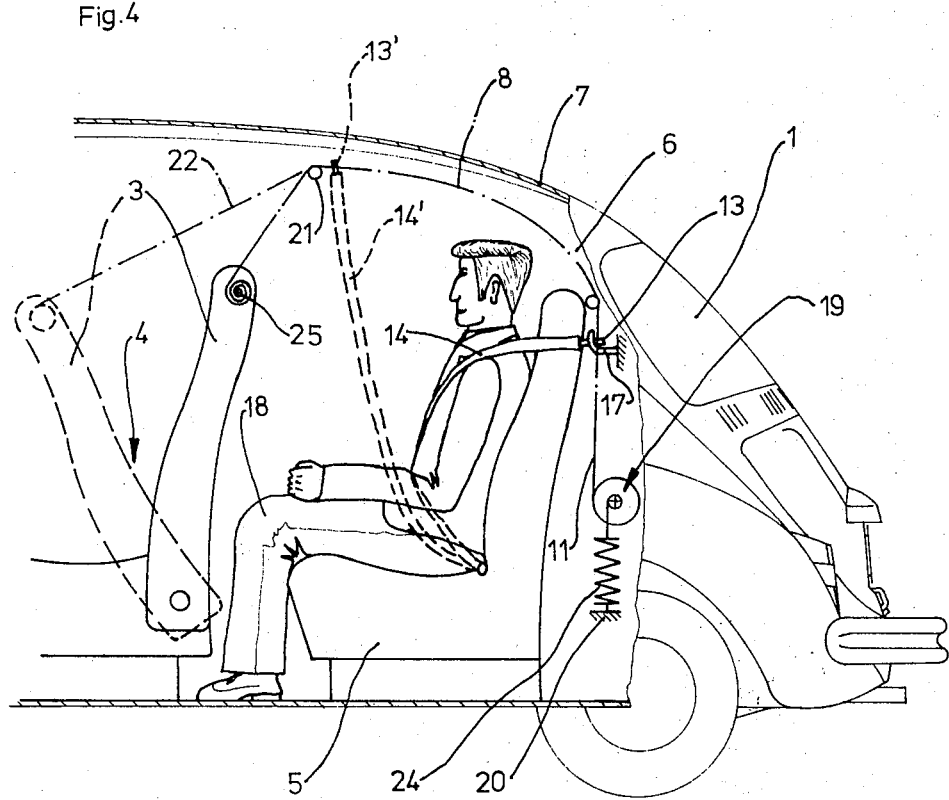
FIG. 4 is a further alternative solution for operating the belt guide.

With reference to FIGS. 1, 2 and 4 it is seen that the vehicle 1 can be entered through a front door 2 and by pushing forward the backrest 3 or the entire seat 4 one may enter also the back seat 5 which can be a pair of individual seats or a single seat.

In a side frame 6 or as can be seen in FIG. 2, in the roof 7 of the vehicle 1 a belt guide means 8 is provided which at one side 9 thereof is operatively coupled with a return spring 10 and on the other hand thereof 11 with a drive means 12. The belt guide means 8 in FIG. 2 is identified by 8' otherwise similar portions in FIG. 2 are identified by the same reference numerals as in FIG. 1 or their primed counterparts. On the belt guide 8, by means of a coupling hook 13, a safety belt 14 is coupled which at another end 15 thereof is coupled with a tensioning device 16. At a height which is the usual height for a coupling point 4 for a shoulder strap and in the region of the belt guide 8, 8' a lock hook 17 is provided fixedly on the vehicle frame 1.

The operation of the safety belt system according to the present invention is as follows:

Before entering the vehicle the safety belt 14 is in the dashed line position which is its initial position. When a rider 18 has assumed the seating position, then the belt guide 8, which is in the form of a cable, becomes pulled by the driving motor 12 until the support 13 becomes inserted by being run into the lock hook 17.

The drive 12 according to the present invention can be started in operation either by the movement of the backrest 3 in its upright position or by the movement of the entire seat 4 in its normal position, or by the closure of the front door 2 or by the operation of the ignition key.

Figure 5:
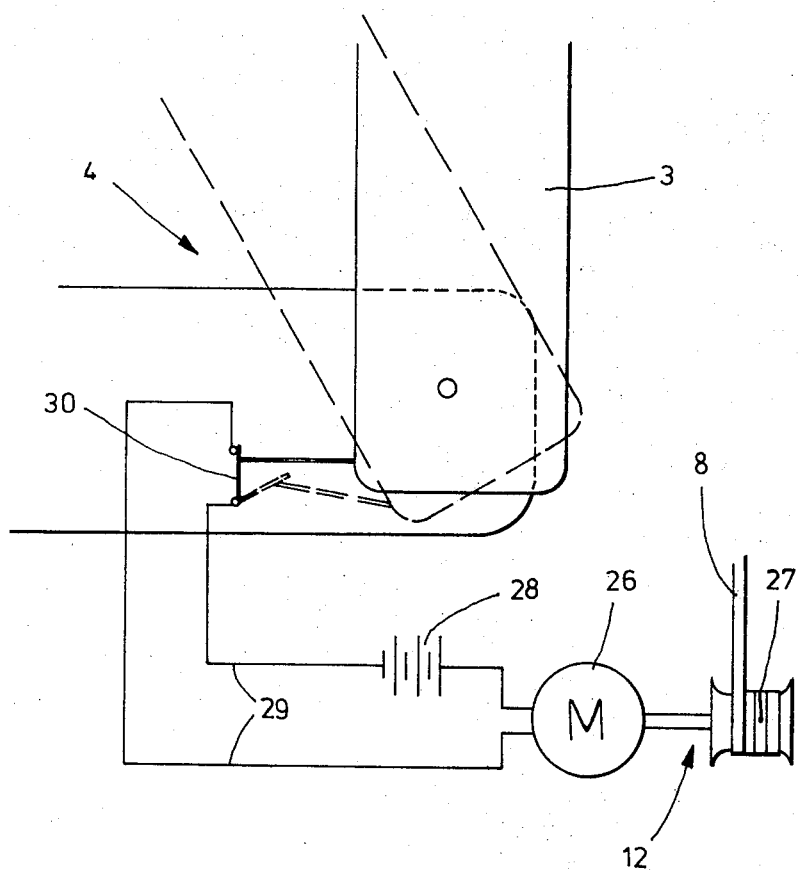
FIG. 5 is a schematic illustration of the actuating means for the back seat safety belt drive.

With respect to the last mentioned features reference should be had to the aforementioned co-pending application wherein a front door operated belt guide system is described along with coupling the energizing motor of the belt guide system with the ignition system. In FIG. 5 the drive 12 is formed by a drum 27 winding the belt of the belt control 8 and which drum 27 is driven by an electro-motor 26. The electro-motor 26 is fed by an electric circuit 29 from a bettery 28 which may, for example, be the vehicle battery. In the circuit 29 there is arranged a switch 30 which, as seen in the drawing, is connected with the back rest 3 of the front seat 4 in such a manner that it is closed when the back rest is upright and open when the back rest is folded frontward. In this manner the motor 26 controls by the actuation of the back rest of the front seats the pulling in the safety belt control 8 on the back seats of a two-door vehicle. Thus, the motor 26 is turned on when the back rest of the front seat is erected and the motor is turned off when the back rest is folded forward.

The belt guide 8, 8' after being pulled upon by the drive 12, described a path illustrated in all figures by the dash-dot line and runs hook 13 into latch 17. During this the returning spring means 10 becomes tensioned. As soon as the rider 18 is ready to leave the vehicle, then by means of a pulse which can be generated either by the front door 2, the ignition key, or by the forward tilting of the front seat 4, or by the backrest 3 of the front seat, will cause the release of a slip coupling of the drive 12, or by a pneumatic piston arrangement wherein the pressure is shifted to the former low pressure side, whereupon the safety belt 14 becomes returned by means of the return spring means 10 into the dashed line position 14, 14' so that the rider 18 can leave the vehicle without obstruction. The leaving of the vehicle becomes extremely comfortable when the belt guide 14', as illustrated in FIG. 2, is secured at the roof of the vehicle in a position shown and the return spring 10 is secured in the region of the center plane 19 of the vehicle 1.

Figure 3:
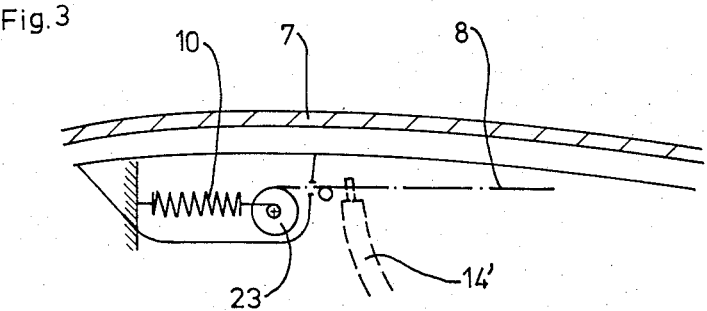
FIG. 3 is an alternative solution of the fixing of the belt guide means at a region indicated by III in FIG. 1.

According to a further embodiment of the present invention illustrated to FIG. 3 the return spring 10 is attached or coupled to the belt guide 8 by means of a translating gear 23, and as a result, the return spring 10 can be made smaller and does not have to be stretched as long as it would have to without the presence of the translating device 23.

It is also possible that the drive means 12 is replaced or combined with a lever or cable system which is operated by a motion of the backrest 3 or of the seat 4 as above explained during the access of a person to the front seat. Such system is illustrated in FIG. 4. The belt guide means 8 is passed over a guide roller 21 and over the extending portion 22 to the backrest 3 of the front seat. On the other side 11 runs the belt guide means 8 over a translating device 19 to a spring 24 which is secured to a portion of the vehicle frame 20.

Upon leaving the vehicle, the backrest 3 is pushed forward into the dashed position illustrated in FIG. 4, and as a result, the safety belt 13, 14 is shifted into the position illustrated by 13', 14' and the spring 24 becomes tensioned, so that the belt guide 8 is under tension and, the belt 14 when the seat 5 is occupied and after the backrest 3 is returned to its upright position will become laid across the rider 18; that is, rider 18 becomes buckled up. The individual operating steps can be aided by the provision of an additional spring biased take up device 25 provided in the backrest 3 as well as by the provision of a motor for the translating device 19 and the control as described above.

According to the present invention a safety belt system has been provided for a two or four door vehicle having a back seat which is a single or a split seat and the automatic features of positioning or buckling of the safety belt have been retained for both two or four door vehicles.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A safety belt arrangement for the back seats in a vehicle with only two front doors and whereby the back seats are accessible from the front doors over the pushed down backrests of the front seats comprising a safety belt having one end portion secured to a portion of the vehicle frame, another end portion of said belt being adapted for being releasable secured to another point of the frame of the vehicle, an operating means, means coupling said operating means to said belt for operating said belt between an initial position in which the seat is accessible and a buckled position in which a person sitting on the seat is safely buckled up by said belt, said coupling means comprising a belt guide means mounted on a frame means of the vehicle and having one end secured with a returning spring means and the other end of said belt guide means being operably coupled with said operating means, hook means coupling said belt guide means to said belt and adapted to be fixedly secured into a latch means fixed to a portion of said vehicle frame and thereby buckling in the seated person when said operating means is actuated and releasing the seated person from the "buckled up" position when said operating means is deactuated, means for coupling the actuation of the operating means with the movement of the backrest of the front seats.

2. The safety belt system as claimed in claim 1, wherein said belt guide means is a cable means.

3. The safety belt system as claimed in claim 1, wherein said belt guide means is passed from a point located at the roof of said vehicle frame substantially corresponding to the center of the vehicle and passed to a point on said vehicle frame located at a height substantially corresponding to the shoulder height of a person on said back seat.

4. The safety belt system as claimed in claim 1, wherein said operating means comprising a motor, and means are provided for actuating the energizing circuit of said motor by the movement of the backrest of said front seat whereby said motor becomes energized for operating said safety belt thereby buckling up seated person in the vehicle when the backrest of the front seat is pushed rearward.

5. The safety belt system as claimed in claim 1, wherein said one end portion of said safety belt is fixed at a point near the floor region of said vehicle at a center plane of the vehicle so that the person entering the vehicle back seat over the pushed down backrest of the front seat is not interfered with any portion of said safety belt in the initial position thereof, and said latching means fixedly secured to a point on said vehicle frame located at a height substantially corresponding to the shoulder height of a person on said back seat so that a buckled up state is resulted when said motor operates and pulls on said belt guide means for moving said belt coupling means into said latched position.

6. The safety belt system as claimed in claim 1, wherein said operating means comprises said front seat, said belt guide means at one end thereof being coupled with the backrest of said front seat and at the other end thereof being coupled with said returning spring means and thereby transferring said safety belt into its buckled up position from its initial position when the backrest of the front seat is set up or from the buckled up position to the initial position when the backrest of the front seat is pushed down.

* * * * *